United States Patent
Fillot

(10) Patent No.: US 11,492,489 B2
(45) Date of Patent: Nov. 8, 2022

(54) HIGH HEAT RESISTANCE POLYAMIDE MOLDING COMPOUND

(71) Applicant: BASF SE, Ludwigshafen am Rhein (DE)

(72) Inventor: Louise-Anne Fillot, Beynost (FR)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/955,924

(22) PCT Filed: Dec. 20, 2018

(86) PCT No.: PCT/EP2018/086216
§ 371 (c)(1),
(2) Date: Jun. 19, 2020

(87) PCT Pub. No.: WO2019/122139
PCT Pub. Date: Jun. 27, 2019

(65) Prior Publication Data
US 2020/0339810 A1    Oct. 29, 2020

(30) Foreign Application Priority Data
Dec. 20, 2017 (EP) .................................... 17306846

(51) Int. Cl.
| | | |
|---|---|---|
| *C08L 77/06* | (2006.01) | |
| *C08L 77/02* | (2006.01) | |
| *C08L 63/00* | (2006.01) | |
| *C08K 3/013* | (2018.01) | |
| *C08K 3/04* | (2006.01) | |
| *C08K 5/00* | (2006.01) | |

(52) U.S. Cl.
CPC .............. *C08L 77/06* (2013.01); *C08K 3/013* (2018.01); *C08K 3/04* (2013.01); *C08K 5/005* (2013.01); *C08L 77/02* (2013.01); *C08L 63/00* (2013.01); *C08L 2201/08* (2013.01); *C08L 2203/30* (2013.01); *C08L 2205/03* (2013.01)

(58) Field of Classification Search
CPC ........... C08L 2205/02; C08L 2205/025; C08L 2205/03
See application file for complete search history.

(56) References Cited

U.S. PATENT DOCUMENTS

| | | | |
|---|---|---|---|
| 5,605,945 A | 2/1997 | Sayed et al. | |
| 8,383,244 B2 | 2/2013 | Bayer et al. | |
| 2013/0188302 A1 | 7/2013 | Brown et al. | |
| 2013/0338260 A1 | 12/2013 | Center et al. | |
| 2013/0338274 A1* | 12/2013 | Center | C08L 77/06 |
| | | | 524/100 |
| 2015/0218374 A1 | 8/2015 | Thomas et al. | |
| 2016/0060434 A1* | 3/2016 | Reinicker | C08K 5/098 |
| | | | 524/398 |
| 2016/0159009 A1* | 6/2016 | Canale | B33Y 10/00 |
| | | | 264/401 |

FOREIGN PATENT DOCUMENTS

WO    2013188302 A1    12/2013

OTHER PUBLICATIONS

International Search Report and Written Opinion for corresponding PCT/EP2018/086216 dated Mar. 28, 2019, 10 pages.

* cited by examiner

*Primary Examiner* — Ana L. Woodward
(74) *Attorney, Agent, or Firm* — Armstrong Teasdale LLP

(57) ABSTRACT

The present disclosure relates to a heat-ageing resistant polyamide molding compound, a molded object made from said polyamide molding compound, and the use of said molded object.

19 Claims, 4 Drawing Sheets

HIGH HEAT RESISTANCE POLYAMIDE MOLDING COMPOUND

CROSS-REFERENCE TO RELATED APPLICATIONS

This application is a U.S. National Phase Application of PCT/EP2018/086216, filed on Dec. 20, 2018, which claims the benefit of priority to European Patent Application Number 17306846.1, filed Dec. 20, 2017, the entire contents of which are hereby incorporated by reference herein.

TECHNICAL FIELD OF THE INVENTION

The present invention relates to a heat-ageing resistant polyamide molding compound, a molded object made from said polyamide molding compound, and the use of said molded object.

BACKGROUND

Thermoplastic polyamides are frequently used in the form of glass-fiber-reinforced molding compounds as construction materials for components that are exposed to high temperatures during their service life, ending with thermooxidative damage. The occurrence of thermooxidative damage, which is manifested, in a decline of a mechanical characteristics, can be delayed through the addition of known heat stabilizers, but it cannot be permanently prevented. Improvement of the heat-ageing stability of polyamides is desirable, since through this long service life for thermally stressed components can be achieved or the risk of failure thereof can be reduced. Furthermore, improved heat-ageing stability can also enable the use of components at higher temperatures.

In order to improve the stability of polyamides with respect to heat, it is known practice to combine them with particular stabilizers. Many additives are sold for this purpose. For example, the use of copper iodide, in particular in combination with potassium iodide, which is used in most cases and which provides good stabilization properties, is known. It is also known practice to use more complex additives such as hindered phenolic antioxidant compounds, stabilizers having at least one hindered amine unit of an HALS type, or phosphorous-containing stabilizers.

For example, US 2015/0218374 suggests to prepare a polyamide molding compound with flame-retardant properties and long-term heat-ageing resistance by combining one partially aromatic, partially crystalline polyamide and one caprolactam-containing polyamide with an organic heat stabilizer based on sterically hindered phenols.

U.S. Pat. No. 8,383,244 also suggests the combination of two polyamides with a thermal stabilizer which can be selected from a broad range of stabilizers, such as mono- and divalent copper compounds, secondary aromatic amines, sterically hindered phenols, as well as phosphites and phosphonites.

WO 2013/188302 A1 disclosed polyamide compositions having improved long-term high temperature ageing characteristics. The compositions contain combinations of different polyamides and, as the heat stabilizer, a primary or secondary amino acid having no hydroxide groups and no more than one carboxylic acid. The compositions may optionally comprise one or more polyepoxy compounds.

US 2014/0309367 describes the use of a polyamide chain-extending compound as an agent for stabilizing the polyamide toward heat, light and/or wet weather.

However, there is still a need to provide polyamide compositions which are even more efficient in terms of stabilization toward heat, and, in particular, which maintain their good physical properties after heat-ageing not only at ambient temperature but also at high temperature.

SUMMARY

An aspect of the present invention provides a polyamide molding compound comprising
- a first semi-crystalline polyamide having a melting point T-1 of at least 200° C.,
- a second semi-crystalline polyamide having a melting point T-2, which is at least 25° C. lower than T-1, wherein the second polyamide is present in an amount of from 1 wt. % to 35 wt. % based on the total weight of the first and second semi-crystalline polyamides, and
- a di-functional epoxy resin in an amount such that the molar ratio of the epoxy groups in the di-functional epoxy resin to acid and amine chain end groups in the first and second semi-crystalline polyamides is in the range of 0.05 to 1;

wherein the molding compound does not contain any lysine.

Another aspect of the present invention provides a molded object made from said polyamide molding compound, a process for preparing such molded object and the use of such molded object in an assembly process for making an automotive engine, a machine, or an electrical or electronic installation.

DETAILED DESCRIPTION

Figure 1:
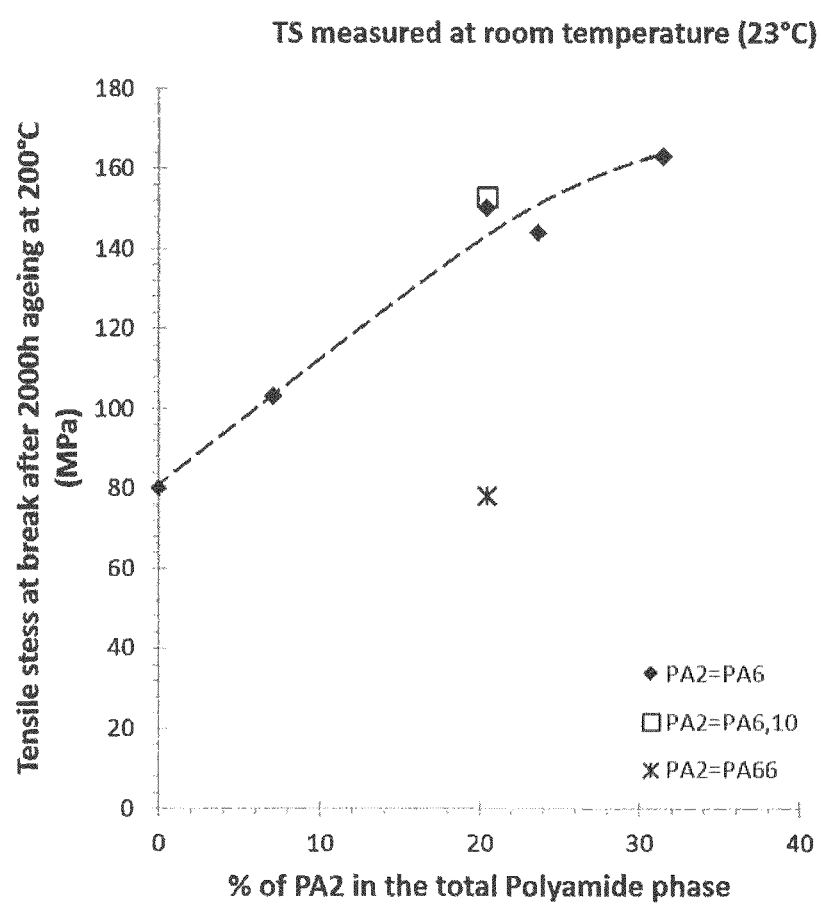
FIG. 1 illustrates the results of measurements conducted at room temperature (23° C.) on a composition in accordance with the present disclosure.

While it is known that the heat-ageing stability of polyamide compounds can be increased by mixing a semi-aromatic, semi-crystalline polyamide having a melting point in the range of 255 to 330° C. with a caprolactam-containing polyamide (U.S. Pat. No. 8,383,244), the present inventors found that, while the addition of the second polyamide actually increases the strength of the polyamide compound after heat-ageing, if the tensile strength is measured at room temperature, the strength of the polyamide decreases at higher amounts of the second polymer, if measured at high temperature. This unexpected finding is important because the molded objects prepared from such polyamide compounds are usually used in high temperature applications.

Upon conducting further experiments, the present inventors additionally found that even within the optimum ratio of first to second polyamide also the amount of epoxy heat stabilizer used is important for the strength of the polyamide after heat-ageing when measured at high temperature. If the strength of the polyamide after heat-ageing is measured at room temperature, an increasing amount of epoxy heat stabilizer increases the strength of the polyamide compound after heat-ageing. However, if measured at high temperature, the present inventors found that, if the amount of epoxy stabilizer is increased beyond a certain level the strength of the polyamide compound surprisingly decreases.

The present inventors therefore found that in order to provide a polyamide composition, which not only shows a good resistance against heat-ageing but additionally after heat-ageing shows high strength at high temperature, both, the ratio of first to second polyamide as well as the amount of epoxy heat stabilizer must be carefully selected within certain ranges.

The present invention therefore provides a polyamide molding compound comprising
  a first semi-crystalline polyamide having a melting point T-1 of at least 200° C.,
  a second semi-crystalline polyamide having a melting point T-2, which is at least 25° C. lower than T-1, wherein the second polyamide is present in an amount of from 10 wt. % to 35 wt. % based on the total weight of the first and second semi-crystalline polyamides, and
  a di-functional epoxy resin in an amount such that the molar ratio of the epoxy groups in the di-functional epoxy resin to acid and amine chain end groups in the first and second semi-crystalline polyamides is in the range of 0.05 to 1;
wherein the molding compound does not contain any lysine.

The present inventors found that if the polyamide molding compound comprises a first semi-crystalline polyamide having a melting point of at least 200° C. and a second semi-crystalline polyamide having a melting point which is at least 25° C. lower than the melting point of the first semi-crystalline polyamide in amounts such that the second polyamide is present at 10 wt. % to 35 wt. % based on the total weight of the first and second semi-crystalline polyamides present in the polyamide molding compound, the strength of the polyamide compound at high temperature (200° C.) measured as tensile stress at break after heat-ageing for 2,000 h at 200° C. shows an optimum. Additionally, the inventors found that if the molar ratio of the epoxy groups in the di-functional epoxy resin to acid and amine chain end groups in the first and second semi-crystalline polyamides is in the range of 0.05 to 1, the strength of the polyamide compound measured at high temperature (200° C.) as tensile stress at break after 2,000 h heat-ageing at 200° C. shows a maximum. Thus, the present invention provides an optimization of the ratio of first to second polyamide as well as an optimization of the amount of di-functional epoxy resin being present in the polyamide compound relative to the polyamide components.

The polyamide molding compound of the invention comprises at least two different polyamides having different melting points. In one embodiment, the polyamide molding compound comprises only two different polyamides, namely the first and the second semi-crystalline polyamide. In this case, the polyamide molding compound does not comprise any further polyamide. It is, however, also possible that the polyamide molding compound comprises further polyamides. For example, the first polyamide having a melting point of at least 200° C. may be a mixture of two or more polyamides, provided that all the amides which constitute the first polyamide have a melting point of at least 200° C. Also the second polyamide may be a mixture of two or more polyamides, provided that all the polyamides which constitute the second polyamide have a melting point which is at least 25° C. lower than the melting point of the first polyamide. If the first polyamide is a mixture of two or more polyamides, the polyamide having the lowest melting point of all the polyamides in this mixture is the relevant one for defining the difference in the melting points between the first and the second polyamides.

The melting temperature of any polyamide in the polyamide molding compound of the invention is measured by differential scanning calorimetry (DSC) according to ISO 11357-3 with a heating rate of 10° C./min and determined as the temperature of the melting peak as measured during the first heating segment.

Besides the first semi-crystalline polyamide and the second semi-crystalline polyamide, the polyamide molding compound of the invention may comprise further polyamides which are not semi-crystalline. Preferably, the polyamide molding compound of the invention does, however, not contain any polyamide in addition to the first semi-crystalline polyamide and the second semi-crystalline polyamide. Thus the total amount of polyamides in the polyamide molding compound of the invention preferably consists of the first semi-crystalline polyamide and the second semi-crystalline polyamide.

The polyamides which may be employed in the polyamide molding compound of the invention may be obtained via polycondensation of at least one aliphatic dicarboxylic acid with an aliphatic or cyclic or cycloaliphatic or arylaliphatic diamine, for instance PA6,6, PA6,10, PA6,12, PA10,10, PA10,6, PA12,12, PA4,6, MXD6, PA9,2, PA10,2, or between at least one aromatic dicarboxylic acid and an aliphatic or aromatic diamine, for instance polyterephthalamides of the type such as PA9,T, PA10,T, PA11,T, PA12,T, PA13,T or PA6T/MT, PA6T/6I, PA66/6T, polyisophthalamides of the type such as PA6I, PA6I/6T, polynaphthalamides of the type such as PA10N, PA11N, PA12N, or a blend thereof and (co)polyamides thereof. The polyamide may also be chosen from polyamides obtained by polycondensation of at least one omega-amino acid or lactam with itself, such as, for example, PA6, PA7, PA11, PA12 or PA13, or a blend thereof and (co)polyamides thereof.

In one embodiment, the first polyamide is PA6,6 or a semi-aromatic polyamide, such as PA66/6T. In a preferred embodiment, the first polyamide is PA6,6 or PA66/6T, more preferably PA66/6T.

In another embodiment, the second polyamide is PA6 or PA6,10. In a preferred embodiment, the second polyamide is PA6.

In a preferred embodiment, the first polyamide is PA6,6 or a semi-aromatic polyamide, such as PA66/6T, and the second polyamide is PA6 or PA6,10. In a more preferred embodiment, the first polyamide is PA6,6 or PA66/6T and the second polyamide is PA6 or PA6,10. In an even more preferred embodiment, the first polyamide is PA66/6T and the second polyamide is PA6.

It is, however, also possible that the first polyamide is PA66/6T and the second polyamide is PA6,6, provided that the melting point of the second polyamide is at least 25° C. lower than the melting point of the first polyamide. This is for example possible if a PA66/6T having a rather high melting point is used, for example PPA.

In the polyamide molding compound of the invention, the second polyamide is present in an amount of from 1 wt. % to 35 wt. %, preferably from 10 to 35 wt. % based on the total weight of the first and second semi-crystalline polyamides.

In one embodiment, the second polyamide is present in the polyamide molding compound of the invention in an amount of up to 32.0 wt. %, preferably of up to 25.0 wt. %, more preferably of less than 22.0 wt. % and most preferably of less than 21.5 wt. %, each based on the total weight of the first and second semi-crystalline polyamides.

The above lower and upper limits of the amount of second polyamide may be combined with each other. For example, the second polyamide may be present in an amount of at least 10 wt. % and up to 32.0 wt. %, or in an amount of at least 10 wt. % and less than 22.0 wt. %, or in an amount of at least 10 wt. % and less than 22.0 wt. %, or in an amount of at least 10.0 wt. % and less than 21.5 wt. %, each based on the total weight of the first and second semi-crystalline polyamides.

In addition to the first semi-crystalline polyamide and the second semi-crystalline polyamide the polyamide molding compound according to the invention comprises at least one di-functional epoxy resin. The polyamide molding compound of the invention may comprise two or more di-functional epoxy resins.

The di-functional epoxy resin is usually capable of reacting with the amine or acid end groups of the polyamides. The two epoxy functions of each di-functional epoxy resin are capable of reacting with the end groups of the polyamides so as to connect two or more polyamide chains as a function of the molar ratio of the epoxy groups in the di-functional epoxy resin to acid and amine chain end groups in the first and second semi-crystalline polyamides and thus to increase the molar mass and the viscosity of the modified polyamide.

The present inventors found that a polyamide molding compound having an optimum strength when measured at high temperature after heat-ageing is obtained if the molar ratio of the epoxy groups in the di-functional epoxy resin to acid and amine chain end groups in the first and second semi-crystalline polyamides is in the range of 0.05 to 1. In a preferred embodiment, the molar ratio of the epoxy groups in the di-functional epoxy resin to acid and amine chain end groups in the first and second semi-crystalline polyamides is in the range of 0.07 to 1, more preferably in the range of 0.2 to 0.7. For the calculation of this ratio, the molar amount of epoxy groups in the di-functional epoxy resin is divided by the sum of the acid and amine chain end groups in the total amount of the first and second semi-crystalline polyamides present in the polyamide molding compound of the invention.

The amount of the di-functional epoxy resin in the polyamide molding compound of the invention can be, for example, in the range of 0.3 to 5.5 wt. %, preferably of 0.8 to 4.0 wt. %, each of the total weight of the first and second semi-crystalline polyamides, provided that the molar ratio of the epoxy groups in the di-functional epoxy resin to acid and amine chain end groups in the first and second semi-crystalline polyamides is within the range of 0.05 to 1.

The di-functional epoxy resin is not particularly limited and can be selected by the skilled person according to the requirements. Di-functional epoxy resins are to be understood as organic compounds comprising two epoxy groups in one molecule. Such organic compounds may show a molecular weight distribution e.g. when measured by GPC (i.e. they can be other than monodispersed). The compounds may comprise additional functional groups but the number of epoxy groups per molecule is limited to two. Suitable di-functional epoxy resins are, for example, bisphenol A-based epoxides, such as bisphenol A diglycidyl ether.

The polyamide molding compound of the present invention may comprise more than 20 wt. %, preferably more than 40 wt. % and more preferably more than 50 wt. % of polyamides, each based on the total weight of the compound.

The polyamide molding compound may additionally comprise at least one filler and/or reinforcing agent and at least one thermal stabilizer. Suitable fillers/reinforcing agents are those conventionally used for the production of polyamide compositions. Mention may in particular be made of reinforcing fibrous fillers, such as glass fibers of various cross section types, such as circular or rectangular, carbon fibers or organic fibers, non-fibrous fillers, such as particulate or lamellar fillers and/or exfoliable or non-exfoliable nano fillers, for instance alumina, carbon black, clays, zirconium phosphate, kaolin, calcium carbonate, copper, diathomaceous earth, graphite, mica, silica, titanium dioxide, zeolites, talc, wollastonite, inorganic whiskers, polymeric fillers, such as, for example, dimethylacrylate particles, glass beads or glass powder. Preferred reinforcing agents are glass fibers, carbon fibers and mixtures thereof.

The polyamide molding compound of the invention can comprise between 1 wt. % and 70 wt. % of at least one filler and/or reinforcing agent, preferably from 20 wt. % to 62 wt. % of filler and/or reinforcing agent, each based on the total weight of the compound.

The polyamide molding compound according to the invention may also comprise other additives participating in the thermal stabilization of the compound, such as those known to the person skilled in the art, such as: mono- or divalent copper compounds, such as the CuI and KI couple, the CuO/KBr couple, the $Cu_2O$/KBr couple, or combinations thereof, halogen salts, hindered phenolic compounds, stabilizers bearing at least one hindered amine unit of HALS type, organic or mineral phosphorus-based stabilizers, such as sodium or manganese hypophosphite, or alternatively compounds comprising at least one polyhydric alcohol comprising from 2 to 8 aliphatic hydroxyl groups, in particular the composition also comprises at least one polyhydric alcohol comprising from 2 to 8 aliphatic hydroxyl groups.

The content of the other additive participating in the thermal stabilization of the polyamide molding compound may range from 0.005 wt. % to 5 wt. %, preferably from 0.005 wt. % to 3.0 w. %, each based on the total weight of the polyamide molding compound.

The polyamide molding compound of the invention may also comprise additives normally used in the production of polyamide compositions. Thus, mention may be made of lubricants, flame retardants, plasticizers, nucleating agents, anti-UV agents, catalysts, antioxidants, antistatic agents, pigments, dyes, matifying agents, molding aids or other conventional additives.

In one embodiment, the polyamide molding compound of the invention comprises
(A) 26.5-78.795 wt. % of polyamides,
(B) 0.2-4.5 wt. % of di-functional epoxy resin,
(C) 20.0-62.0 wt. % of filler and/or reinforcing agent,
(D) 0.005-3.0 wt. % of thermal stabilizer, and
(E) 0-5.0 wt. % of at least one additive,
wherein the components (A)-(E) add up to 100 wt. %.

The polyamide molding compound of the invention does not contain any lysine. In a preferred embodiment, it does not contain any primary or secondary amino acid having no hydroxyl groups and no more than one carboxylic acid. Even more preferably, the polyamide molding compound of the invention does not contain any alpha amino acid.

In one embodiment, the polyamide molding compound of the invention does not contain 0.5 wt. % of Irgatec NC 66, based on the total weight of the compound. Preferably, the polyamide molding compound does not contain any Irgatec NC 66. Alternatively or additionally, the polyamide molding compound of the invention does not contain 0.28 wt. % of kaolin, based on the total weight of the compound, preferably the polyamide molding compound does not contain any kaolin.

The polyamide molding compound of the invention can be manufactured by mixing the di-functional epoxy resin with the first and second polyamides. The di-functional epoxy resin may be added to the already formed or partially formed polyamides, especially such as by placing in contact with oligomers of the polyamides. The di-functional epoxy resin may be added during the polymerization of the polyamides or added to the molten polyamides, for example by extrusion. The di-functional epoxy resin may also be premixed together with the polyamides in the solid state, followed by melting of the mixture, e.g. by extrusion or injection molding, or blow molding etc.

If present, the filler/reinforcing agent and further thermal stabilizer as well as any further additives may be mixed into the polyamide molding compound before, together with or after the di-functional epoxy resin. According to a particular embodiment, premixes, in the melt or not in the melt, of the di-functional epoxy resin and the polyamides may be prepared before preparing the final composition. It is possible, for example, to prepare a premix of the di-functional epoxy resin and the polyamides, such as to make a master batch, which is then used for further mixing with a filler and/or reinforcing agent and a thermal stabilizer and, optionally, further additives.

In one embodiment, the polyamide molding compound of the invention is obtained by blending the various ingredients without heating or in the melt. The process is performed at more or less high temperature and at more or less high shear force, according to the nature of the various components. The components can be introduced simultaneously or successively. Use is generally made of an extrusion device in which the material is heated, then melted and subjected to a shear force, and conveyed.

The polyamide molding compound of the invention, when it is prepared using an extrusion device, is preferably shaped in the form of granules. The granules can be further remelted and shaped into injection molded or extruded or blow molded or rotational molded objects. The molded objects are thus constituted of the compound.

The polyamide molding compound of the invention may be used for any process for forming plastics, for instance the molding process, in particular injection molding, extrusion, extrusion blow-molding or rotational molding. The extrusion process may especially be a spinning process of fibers or a process for manufacturing films.

The present invention therefore also relates to a process for preparing a molded object comprising feeding the polyamide molding compound according to the invention, and optionally further ingredients, to a molding machine.

The present invention also relates to molded objects made from the polyamide molding compound of the invention and to the use of such objects in an assembly process for making, for example, an automotive engine part, a mechanical equipment, or an electrical or electronic installation.

A particular advantage of the molded objects of the present invention is that they are suitable for applications exposed to high temperatures, especially temperatures of greater than or equal to 80° C., more particularly temperatures of greater than or equal to 150° C., and more specifically temperatures of greater than or equal to 200° C., but below the melting point of the compound.

Other details or advantages of the invention will become more clearly apparent in the light of the following examples, which are not intended as limiting.

Examples

Polyamide molding compounds according to the following examples and reference examples were prepared using the following general process. The compositions of the various compounds are summarized in table 1 and the results of the measurements conducted are summarized in table 2. Furthermore, the results are shown in attached FIGS. 1-4.

Examples E1-E7 are according to the invention. Reference Example C1 relates to a polyamide molding compound comprising no second semi-crystalline polyamide, Reference Example C3 relates to a polyamide molding compound which does not contain any di-functional epoxy resin and Reference Example C4 relates to a polyamide molding compound wherein the second semi-crystalline polyamide has a melting point which is only 20° C. lower than the melting point of the first semi-crystalline polyamide.

The following ingredients were used:

Polyamide 66/6T: commercial grade 26UD1 manufactured by Solvay, with a molar ratio of terephtalic acid to adipic acid of 35 to 65. VI=80 mL/g, EG=127 mL/g, Tm=280° C.

Polyamide 6: commercial grade S40 BL Nat manufactured by Solvay, with EG=105 mL/g, Tm=215° C., VI=150 mL/g.

Polyamide 6,6: commercial grade 26AE2 manufactured by Solvay, with EG=125 mL/g, VI=134 mL/g, Tm=260° C.

Polyamide 6,10: commercial grade 28CE2 manufactured by Solvay, with EG=115 mL/g, VI=140 mL/g, Tm=225° C.

Glass Fiber: OCV 995 from Owens Corning

Inorganic stabilizers: Copper oxide ($Cu_2O$) from Altichem and Potassium Bromide (KBr) from Chemtra Comercial Blacks: Carbons blacks from Hudson color concentrates and Nigrosin from Manuel Vilaseca Lubricants: LT107 from Baerlocher Di-epoxy: Araldite GT7071 from Huntsman, with epoxy value: 1.89 to 2.22 eq/kg, and epoxy equivalent weight: 450-530 g/eq.

All examples and comparative examples were prepared according to the following general procedure:

Before compounding, pellets of polyamides were dried to decrease the water content below 1500 ppm. The compositions were obtained by melt blending of the selected ingredients in a Werner&Pleifeder ZSK 40 twin-screw extruder using the following parameters: 35 kg/hour, 250 rounds per minute, 5 heating zones: 275, 280, 290, 295, 300° C. All ingredients were fed at the beginning of the extruder. The extruder strand was cooled in a water bath, then pelletized and the obtained pellets were stored into sealed aluminium line bags to prevent moisture adsorption.

All examples and comparative examples comprise in addition to the components summarized in table 1 35 wt. % of glass fiber, 0.0088 wt. % of $Cu_2O$, 0.1228 wt. % of KBr, 0.1184 wt. % of carbon black, 0.1184 wt. % of Nigrosin, and 0.1316 wt. % of wax, each related to the total weight of the formulation.

Viscosity index, end-group concentration and melting temperature of the polyamide molding compounds obtained were measured using the following methods:

Viscosity Index (VI) of polyamide measured in a formic acid solution according to ISO 307;

End-group (EG) concentration (AEG: amine, CEG: Acid) measured by potentiometry;

Melting temperature (Tm) measured by Differential Scanning calorimetry according to ISO 11357-3.

TABLE 1

|  |  | C1 | C2 | E1 | E2 | E3 | C3 | E4 |
|---|---|---|---|---|---|---|---|---|
| PA66/6T | % in the formulation | 63.5 | 59 | 50.5 | 48.5 | 43.5 | 51.5 | 51.2 |
| PA6 | % in the formulation | — | 4.5 | 13 | 15 | 20 | 13 | 13 |
|  | % in the PA phase | — | 7.1 | 20.5 | 23.6 | 31.5 | 20.2 | 20.2 |
| PA6,10 | % in the formulation | — | — | — | — | — | — | — |
|  | % in the PA phase | — | — | — | — | — | — | — |
| PA6,6 | % in the formulation | — | — | — | — | — | — | — |
|  | % in the PA phase | — | — | — | — | — | — | — |
| Di-epoxy | % in the formulation | 1 | 1 | 1 | 1 | 1 | — | 0.3 |
|  | ratio (epoxy/chain ends) | 0.28 | 0.29 | 0.30 | 0.30 | 0.30 | — | 0.08 |
| AEG (meq/kg) |  |  | 54 | 55 |  | 57.7 |  | 67.9 |
| CEG (meq/kg) |  |  | 68.1 | 62.1 |  | 57.7 |  | 67.9 |
| End Groups (meq/kg) |  | 125 | 122.1 | 117.1 | 117 | 115.4 | 140 | 135.8 |
| Viscosity index (mL/g) |  |  | 110.8 | 124.5 |  | 140.2 |  | 110.2 |

|  |  | E1 | E5 | E6 | C1 | E7 | C4 |
|---|---|---|---|---|---|---|---|
| PA66/6T | % in the formulation | 50.5 | 49.5 | 48.3 | 63.5 | 50.5 | 50.5 |
| PA6 | % in the formulation | 13 | 13 | 13 | — | — | — |
|  | % in the PA phase | 20.5 | 20.8 | 21.2 | — | — | — |
| PA6,10 | % in the formulation | — | — | — | — | 13.0 | — |
|  | % in the PA phase | — | — | — | — | 20.5 | — |
| PA6,6 | % in the formulation | — | — | — | — | — | 13.0 |
|  | % in the PA phase | — | — | — | — | — | 20.5 |
| Di-epoxy | % in the formulation | 1 | 2 | 3.2 | 1 | 1 | 1 |
|  | ratio (epoxy/chain ends) | 0.30 | 0.61 | 0.89 | 0.28 | 0.30 | 0.30 |
| AEG (meq/kg) |  | 55 | 58.4 | 65.1 |  |  |  |
| CEG (meq/kg) |  | 62.1 | 58.4 | 65.1 |  |  |  |
| End Groups (meq/kg) |  | 117.1 | 116.8 | 130.2 | 125 | 117 | 117 |
| Viscosity index (mL/g) |  | 124.5 | 148.6 | 123.9 |  |  |  |

The heat-ageing resistance of the polyamide molding compounds obtained were evaluated as follows:

The compositions were injection-molded using a DEMAG 50T injection molding machine with a Barrel temperature around 300° C. and a mold temperatures set at 110° C., to prepare 4 mm thick ISO527 specimens. Before ageing initial mechanical properties (Tensile Modulus (E), Tensile strength at Break (TS) and elongation at break) were characterized by tensile measurements according to ISO 527/1A at 23° C. and 200° C. The average value was obtained from 5 specimens.

Then the specimens were heat-aged in a re-circulating air oven (Heraeus TK62210) set at 200° C. After 2000 h of ageing, the specimens were removed from the oven, allowed to cool to room temperature and placed into sealed aluminium lined bags until ready for testing. Mechanical properties were then measured according to ISO 527/1A, at 23° C. and 200° C.

The results are summarized in the following table 2.

TABLE 2

|  |  |  | C1 | C2 | E1 | E2 | E3 | C3 | E4 |
|---|---|---|---|---|---|---|---|---|---|
| Dry as molded (before ageing) - 23° C. | Tensile strength at break at 23° C.(MPa) - ISO527/1A | | 205 | 210 | 204 | 204 | 200 | 202 | 208 |
|  | Tensile Modulus at 23° C. (Mpa) - ISO527/1A | | 11300 | 11100 | 11500 | 11460 | 10900 | 11300 | 11000 |

TABLE 2-continued

|  |  |  |  |  |  |  |  |
|---|---|---|---|---|---|---|---|
|  | Elongation at break at 23° C.(MPa) - ISO527/1A | 3.1 | 3.1 | 3.2 | 3.3 | 3.4 | 2.9 | 3.1 |
| Dry as molded (before ageing) - 200° C. | Tensile strength at break at 200° C.(MPa) - ISO527/1A | 66 | 63.2 | 57 | 56 | 52.4 | 60 | 59.9 |
|  | Tensile Modulus at 200° C. (Mpa) - ISO527/1A | 3200 | 3050 | 2735 | 2650 | 2210 | 2790 | 2700 |
|  | Elongation at break at 200° C.(MPa) - ISO527/1A | 17 | 17.9 | 20 | 21.1 | 21.1 | 19.7 | 19.3 |
| After ageing 2000 h at 200° C. - Meas. 23° C. | Tensile strength at break at 23° C.(MPa) - ISO527/1A | 80 | 103 | 150 | 144 | 163 | 133 | 138 |
|  | Tensile Modulus at 23° C. (Mpa) - ISO527/1A | 11400 | 11200 | 11600 | 11400 | 11400 | 11300 | 11500 |
| After ageing 2000 h at 200° C. - Meas. 23° C. | Elongation at break at 23° C.(MPa) - ISO527/1A | 0.9 | 1 | 1.6 | 1.5 | 1.8 | 1.3 | 1.4 |
| After ageing 2000 h at 200° C. - Meas. 200° C. | Tensile strength at break at 200° C.(MPa) - ISO527/1A | 40 | 48.3 | 54 | 52 | 46.2 | 50 | 51.8 |
|  | Tensile Modulus at 200° C. (Mpa) - ISO527/1A | 8000 | 7410 | 5500 | 5300 | 4960 | 5530 | 6180 |
|  | Elongation at break at 200° C.(MPa) - ISO527/1A | 1 | 1.07 | 2.5 | 2.6 | 2.9 | 1.5 | 1.7 |

|  |  | E1 | E5 | E6 | C1 | E7 | C4 |
|---|---|---|---|---|---|---|---|
| Dry as molded (before ageing) - 23° C. | Tensile strength at break at 23° C.(MPa) - ISO527/1A | 204 | 199 | 193 | 205 | 205 | 195 |
|  | Tensile Modulus at 23° C. (Mpa) - ISO527/1A | 11500 | 11200 | 10900 | 11300 | 11700 | 10810 |
|  | Elongation at break at 23° C.(MPa) - ISO527/1A | 3.2 | 3.1 | 2.9 | 3.1 | 3 | 3 |
| Dry as molded (before ageing) - 200° C. | Tensile strength at break at 200° C.(MPa) - ISO527/1A | 57 | 47.7 | 37.9 | 66 | 50 | 68 |
|  | Tensile Modulus at 200° C. (Mpa) - ISO527/1A | 2735 | 2320 | 2070 | 3200 | 3010 | 3360 |
|  | Elongation at break at 200° C.(MPa) - ISO527/1A | 20 | 17.2 | 13.1 | 17 | 12 | >10% |
| After ageing 2000 h at 200° C. - Meas. 23° C. | Tensile strength at break at 23° C.(MPa) - ISO527/1A | 150 | 159 | 166 | 80 | 153 | 78 |
|  | Tensile Modulus at 23° C. (Mpa) - ISO527/1A | 11600 | 11500 | 11500 | 11400 | 11800 | 11440 |
| After ageing 2000 h at 200° C. - Meas. 23° C. | Elongation at break at 23° C.(MPa) - ISO527/1A | 1.6 | 1.7 | 1.9 | 0.9 | 1.6 | 0.8 |
| After ageing 2000 h at 200° C. - Meas. 200° C. | Tensile strength at break at 200° C.(MPa) - ISO527/1A | 54 | 54.2 | 51.4 | 40 | 45 | 37 |
|  | Tensile Modulus at 200° C. (Mpa) - ISO527/1A | 5500 | 4590 | 3970 | 8000 | 5700 | 7000 |
|  | Elongation at break at 200° C.(MPa) - ISO527/1A | 2.5 | 4.1 | 4.5 | 1 | 1.9 | 0.7 |

Figure 2:
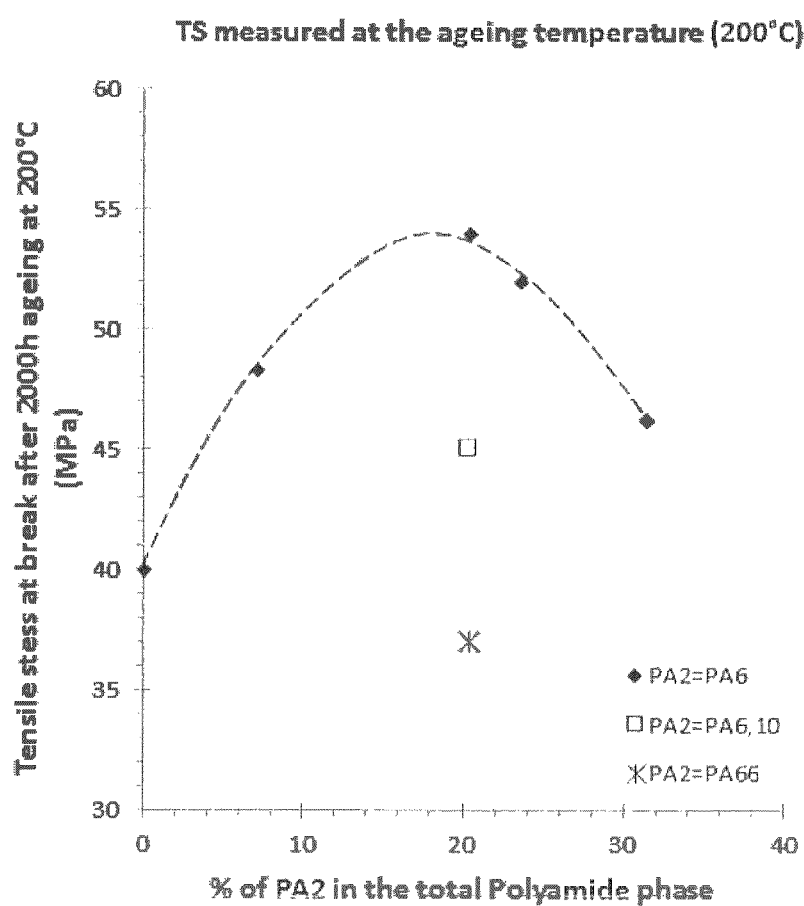
FIG. 2 illustrates the results of measurements conducted at the ageing temperature (200° C.) on a composition in accordance with the present disclosure.

The numerical date in table 2 are visualized in attached FIGS. 1-4. From FIG. 1 it is apparent that an increasing amount of the second polyamide (PA2) results in an increase in tensile stress at break after heat-ageing, if the tensile stress is measured at room temperature. However, FIG. 2 shows that this relationship is no longer valid if the tensile stress at break is measured at a high temperature of 200° C. At this temperature, the tensile stress shows a maximum at about 19 wt. % of the second polyamide in the polyamide phase. Further increase of the amount of the second polyamide results in a decrease in tensile stress, which is, however, still improved over compounds having no second polyamide, but only up to an amount of about 35 wt. % of the second polyamide.

Figure 3:
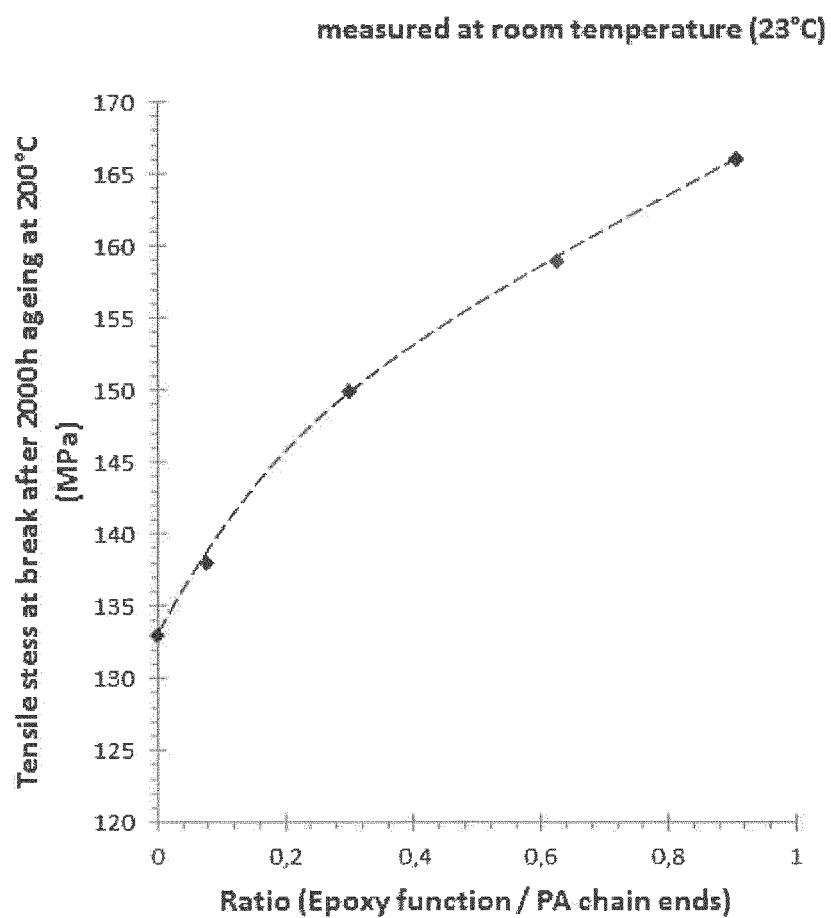
FIG. 3 illustrates the results of measurements conducted at room temperature (23° C.) on a composition in accordance with the present disclosure.
Figure 4:
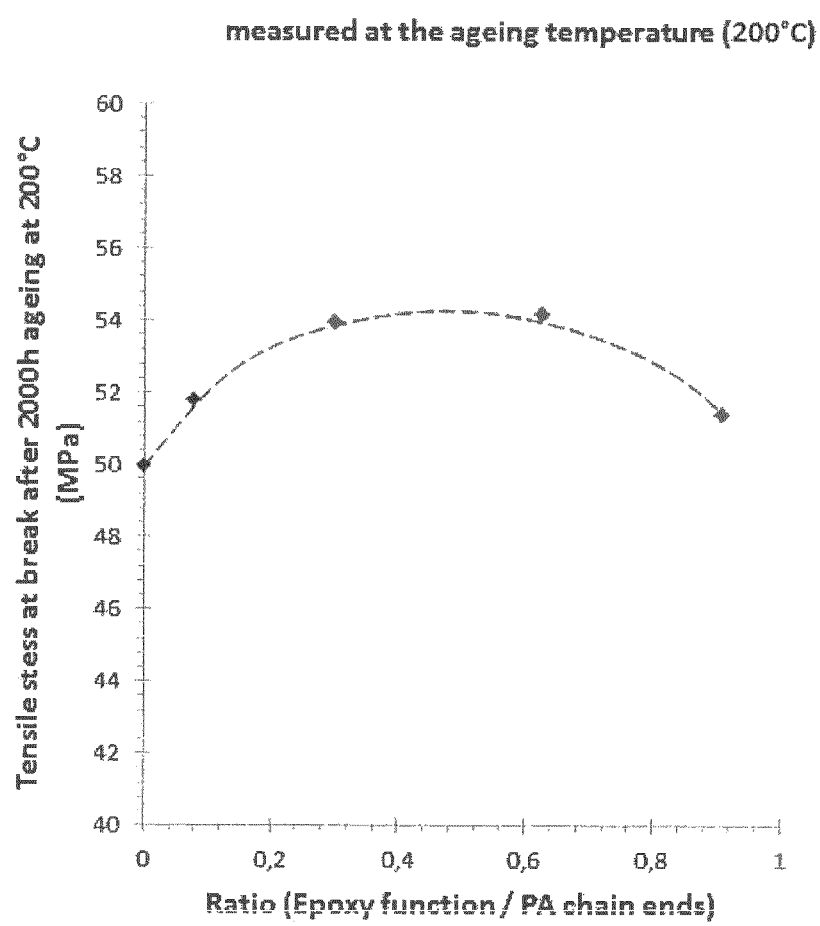
FIG. 4 illustrates the results of measurements conducted at the ageing temperature (200° C.) on a composition in accordance with the present disclosure.

A similar effect is apparent from the data in FIGS. 3 and 4. If measured at room temperature, the tensile stress at break after heat-ageing increases with an increasing ratio of epoxy function to polyamide chain ends. However, if measured at a high temperature of 200° C., the tensile stress at break has a maximum and then decreases with increasing ratio of epoxy function to polyamide chain ends.

The above data demonstrate that the polyamide molding compound of the present invention is optimized such that it exhibits high strength after heat ageing not only at room temperature but also at high temperatures. Therefore, the polyamide molding compound of the present invention is particularly suitable for high temperature applications.

The invention claimed is:

1. Polyamide molding compound comprising
   a first semi-crystalline polyamide having a melting point T-1 of at least 200° C.,
   a second semi-crystalline polyamide having a melting point T-2, which is at least 25° C. lower than T-1, wherein the second polyamide is present in an amount of from 20.2 wt. % to 35 wt. % based on a total weight of the first and second semi-crystalline polyamides, and
   a di-functional epoxy resin in an amount such that a molar ratio of epoxy groups in the di-functional epoxy resin to acid and amine chain end groups in the first and second semi-crystalline polyamides is in a range of 0.05 to 1;
   wherein the molding compound does not contain any lysine.

2. Polyamide molding compound according to claim 1, wherein the first polyamide is PA6,6 or a semi-aromatic polyamide, such as PA66/6T.

3. Polyamide molding compound according to claim 1, wherein the second polyamide is PA6 or PA6,10.

4. Polyamide molding compound according to claim 1, wherein the first polyamide is PA66/6T and the second polyamide is PA6.

5. Polyamide molding compound according to claim 1, wherein T-1 is at least 220° C., and T-2 is at least 30° C. lower than T-1.

6. Polyamide molding compound according to claim 1, wherein the second polyamide is present in an amount of up to 32.0 wt. % based on the total weight of the first and second semi-crystalline polyamides.

7. Polyamide molding compound according to claim 1, wherein the molar ratio of the epoxy groups in the di-functional epoxy resin to acid and amine chain end groups in the first and second semi-crystalline polyamides is in the range of 0.07 to 1.

8. Polyamide molding compound according to claim 1, wherein the di-functional epoxy resin is present in an amount of 0.3 to 5.5 wt. % each of the total weight of the first and second semi-crystalline polyamides.

9. Polyamide molding compound according to claim 1, further comprising at least one filler and/or reinforcing agent and at least one further thermal stabilizer.

10. Polyamide molding compound according to claim 9, wherein the reinforcing agent is selected from the group consisting of glass fibers, carbon fibers and mixtures thereof, and/or the thermal stabilizer is selected from the group consisting of compounds of mono- or divalent copper, halogen salts, stabilizers based on secondary aromatic amines, stabilizers based on sterically hindered phenols, phosphites, hypophosphites, phosphonites, and mixtures thereof.

11. Polyamide molding compound according to claim 1 comprising
   (A) 26.5-78.795 wt. % of polyamides,
   (B) 0.2-4.5 wt. % of di-functional epoxy resin,
   (C) 20.0-62.0 wt. % of filler and/or reinforcing agent,
   (D) 0.005-3.0 wt. % of a further thermal stabilizer, and
   (E) 0-5.0 wt. % of at least one further additive,
   wherein components (A)-(E) add up to 100 wt. %.

12. A molded object made from a polyamide molding compound according to claim 1.

13. Process for preparing a molded object comprising feeding a polyamide molding compound according to claim 1, and optionally further ingredients, to a molding machine.

14. Polyamide molding compound according to claim 1, wherein the first polyamide is PA66/6T.

15. Polyamide molding compound according to claim 1, wherein the second polyamide is PA6.

16. Polyamide molding compound according to claim 1, wherein the second polyamide is present in an amount of up to 25.0 wt. %, based on the total weight of the first and second semi-crystalline polyamides.

17. Polyamide molding compound according to claim 1, wherein the second polyamide is present in an amount of less than 22.0 wt. % %, based on the total weight of the first and second semi-crystalline polyamides.

18. Polyamide molding compound according to claim 1, wherein the second polyamide is present in an amount of less than 21.5 wt. % %, based on the total weight of the first and second semi-crystalline polyamides.

19. Polyamide molding compound according to claim 1, wherein the molar ratio of the epoxy groups in the di-functional epoxy resin to acid and amine chain end groups in the first and second semi-crystalline polyamides is in a range of 0.2 to 0.7.

* * * * *